US006237626B1

United States Patent
Wilkins (10) Patent No.: US 6,237,626 B1
(45) Date of Patent: May 29, 2001

(54) REMOTE VALVE POSITION INDICATOR

(75) Inventor: Larry C. Wilkins, Georgetown, IN (US)

(73) Assignee: Electromechanical Research Laboratories, Inc., New Albany, IN (US)

(*) Notice: Subject to any disclaimer, the term of this patent is extended or adjusted under 35 U.S.C. 154(b) by 0 days.

(21) Appl. No.: 09/564,325

(22) Filed: May 3, 2000

(51) Int. Cl.[7] ................................................. F16K 37/00
(52) U.S. Cl. ...................... 137/556.3; 137/556; 251/248
(58) Field of Search .............................. 137/556.3, 556, 137/553; 251/248, 249.5, 144

(56) References Cited

U.S. PATENT DOCUMENTS

| | | | |
|---|---|---|---|
| 3,927,702 | * 12/1975 | Ingle et al. | 141/285 |
| 4,384,704 | * 5/1983 | Wolff | 251/144 |
| 5,076,308 | * 12/1991 | Cohen | 137/556.3 X |
| 5,538,037 | * 7/1996 | Pizao | 137/556.3 X |
| 6,009,899 | * 1/2000 | Polutnik | 137/556.3 |

* cited by examiner

Primary Examiner—Kevin Lee
(74) Attorney, Agent, or Firm—Woodard, Emhardt, Naughton, Moriarty & McNett (57) ABSTRACT

In liquid carrying cargo tanks of barges, with valves located inside the tanks at the bottom, valve position indicator assemblies are mounted at the valve operating shaft, above deck and fixed in position relative to the tank above the top of the tank. Each assembly includes a two-piece gear that is clamped onto the valve operating shaft. A mating gear is mounted on a shaft parallel to the valve operating shaft and having a screw thread on it. A nut mounted on the screw thread has an indicator pointer mounted to it and which moves vertically relative to the screw as the shaft is rotated and advances between a lowermost position on an indicator scale indicating valve closed condition, and an uppermost position on an indicator scale indicating valve open condition, as the valve operated shaft is rotated to operate the valve between the closed position and the open position. Various mounting arrangements are used.

15 Claims, 13 Drawing Sheets

REMOTE VALVE POSITION INDICATOR

BACKGROUND OF THE INVENTION

1. Field of the Invention

This invention relates generally to tank cargo valves, and more particularly to valves in the bottom of deep tanks and operated by a long shaft with an operating handle at or above the top of the tank.

2. Description of the Prior Art

Many barges have liquid cargo holding tanks with valves located at or near the bottom, inside the tank. The tanks are in abutting or closely-spaced relationship. Therefore, the valves are inside the tanks near the bottom and must be operated from the deck above the valve. For this purpose, a long shaft is used to operate the valve, one end of the shaft being at the valve, and the upper end having a hand wheel on it above the deck of the barge for operation by a person on the deck. One type of valve is a gate valve in which a gate is raised or lowered, respectively, to open or shut the valve. For some such valves, the operating shaft rises to open the gate and descends to close the gate. In those cases, it is relatively easy to determine from the deck level, whether the gate is open or shut. The other type of gate valve is a non-rising stem valve. In these, the operating shaft is screwed into the gate or an attachment to the gate, rather than to the valve body. Consequently, the valve can be opened and shut without the operating shaft rising or descending. Therefore, there is no way to determine from deck level, whether the valve is open, other than turning it clockwise until it stops, indicating that the valve is shut, or turning it counterclockwise until the operating handle stops, typically indicating that the valve is open. But sometimes valves get stuck. In such cases, the operating handle will not turn either clockwise or counterclockwise. Therefore, the operator does not know whether the valve is open or shut.

To address this problem, a valve position indicator has been used in the past so that, while the valve is being opened or closed, the indicator, at or above deck level, will track the valve gate position as it is being opened or closed, so that the operator can determine at a glance, whether the valve is opened or closed.

Many barges with non-rising operating shafts, do not have any valve position indicator on them. But as such barges age, there is a greater likelihood that the valve may become stuck open or closed. If the operator is not able to turn the shaft either way, sometimes assistance will be used in the nature of a long bar or a pipe wrench with a bar on it and placed on the shaft or through the handle to add leverage. The result of such efforts frequently is damage or destruction of the valve, or inability to move the valve one way or the other.

To avoid such problems governmental authorities require that all barges having non-rising stem valves, have valve position indicators incorporated with them. Prior art efforts have provided a valve position indicator near the top of the shaft. But the only one of which I am aware, requires removal of the hand wheel from the top of the shaft in order to install a portion of the indicator assembly. But a problem frequently encountered with such an effort is that the hand wheel cannot be removed because it is either welded onto the shaft or has so badly corroded that it will not come off. In such cases it is necessary to use a cutting torch to remove the hand wheel. But a cutting torch cannot be used until the barge is "gas free". Thus it is necessary to take the barge out of service and send it to a facility which has the ability to clean and free the barge of any combustible gases. The cost of this service alone is in excess of $5000. In addition, of course, there is the factor of loss of use of the barge. The present invention is addressed to solving this problem.

SUMMARY OF THE INVENTION

Described briefly, according to one embodiment of the present invention, a valve position indicator assembly is mounted at the valve operating shaft and fixed in position relative to the tank above the top of the tank. It includes a two-piece gear that is clamped onto the valve operating shaft. A mating gear is mounted on a shaft parallel to the valve operating shaft and having a screw thread on it. A nut mounted on the screw thread has an indicator stem or pointer mounted to it and which moves vertically relative to the screw as the shaft is rotated and advances between a lowermost position on an indicator scale indicating that the valve is closed, and an uppermost position on an indicator scale indicating that the valve is open, as the valve operating shaft is rotated to operate the valve between the closed position and the open position.

DESCRIPTION OF THE ILLUSTRATED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
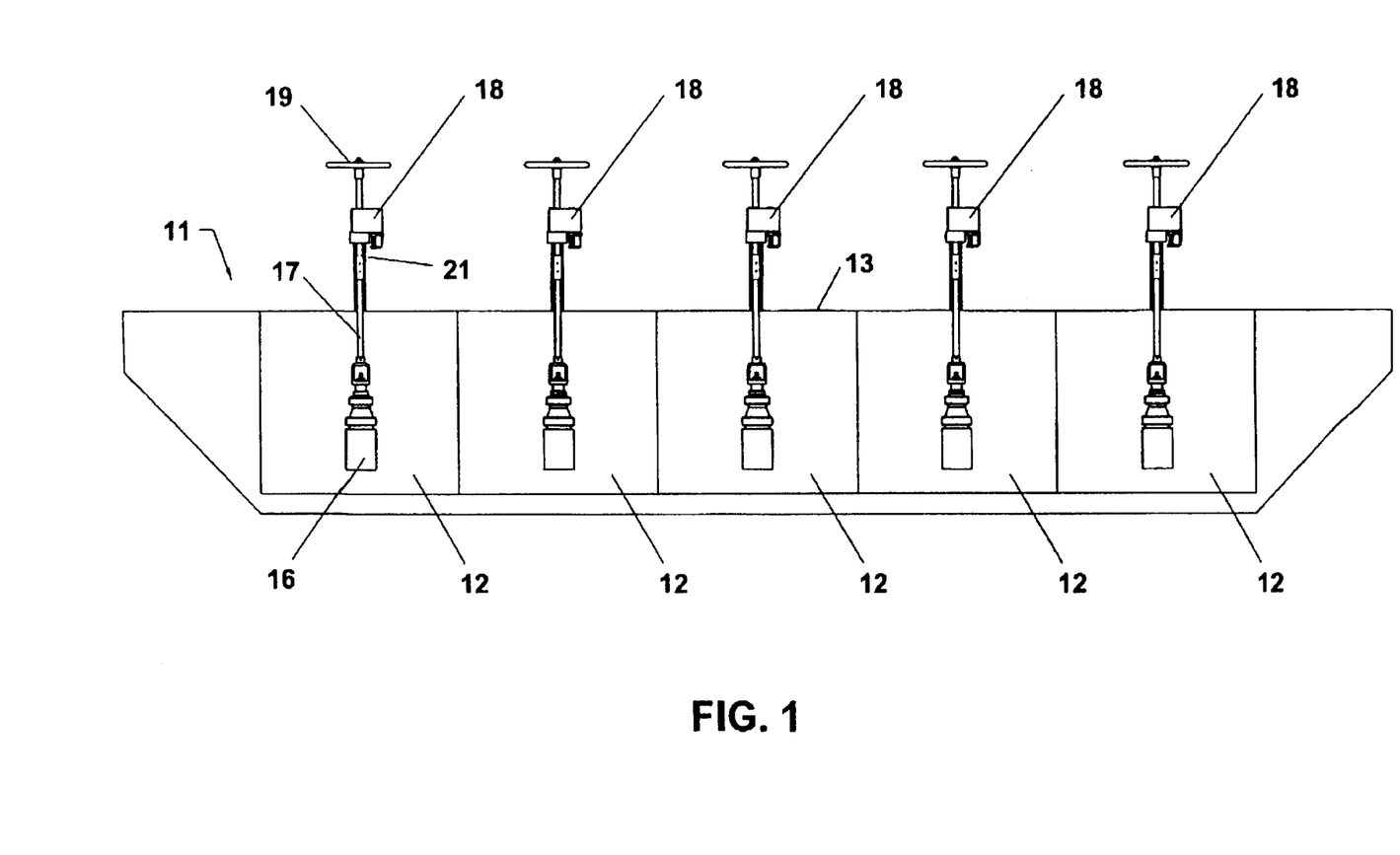
FIG. 1 is a schematic longitudinal sectional view of a barge showing an example of an in-tank valve, operating shaft and handle, with a valve position indicator assembly installed on it, according to one embodiment of the present invention.
Figure 1A:
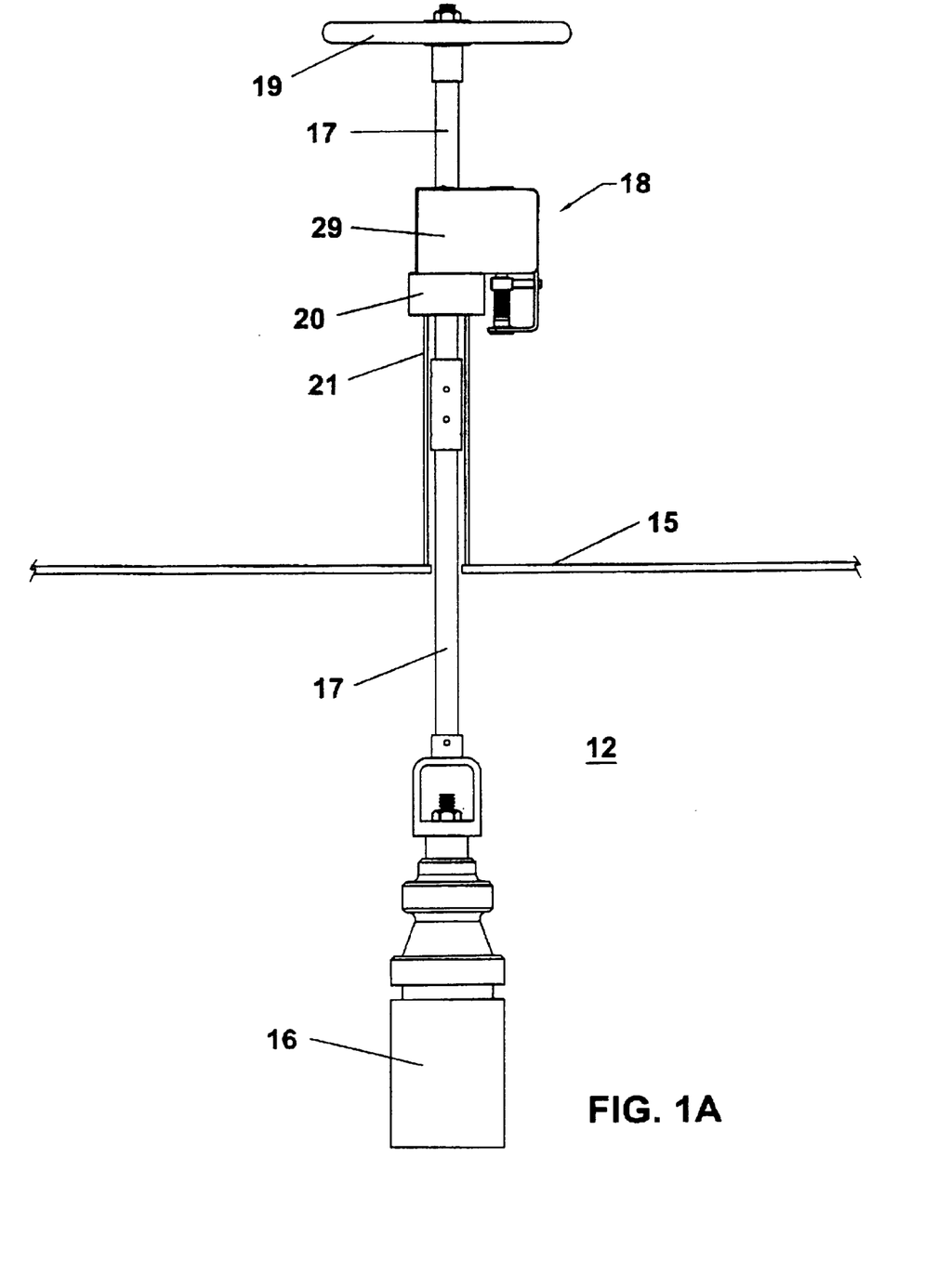
FIG. 1A is an enlarged elevational view of a portion of the tank 12 illustrated in FIG. 1 with the valve position assembly installed on it.

Referring now to the drawings in detail, in FIG. 1, there is shown a barge 11 having a plurality of liquid holding tanks 12 therein. Each of these tanks would typically have a cargo valve inside the tank and operable by a hand wheel above the deck 13 of the barge. In the illustration, only one of the tanks is shown so-equipped, for simplicity and convenience of drawing. In that particular tank, a cargo valve 16 is provided with a valve operating shaft 17 extending up through packing box 20 fixed to the top of a stand pipe 21 which is fixed to the top 15 of the tank at about barge deck level 13. The shaft is sealed by packing in box 20 and has a valve-operating hand wheel 19 secured at the top of the shaft.

Figure 2:
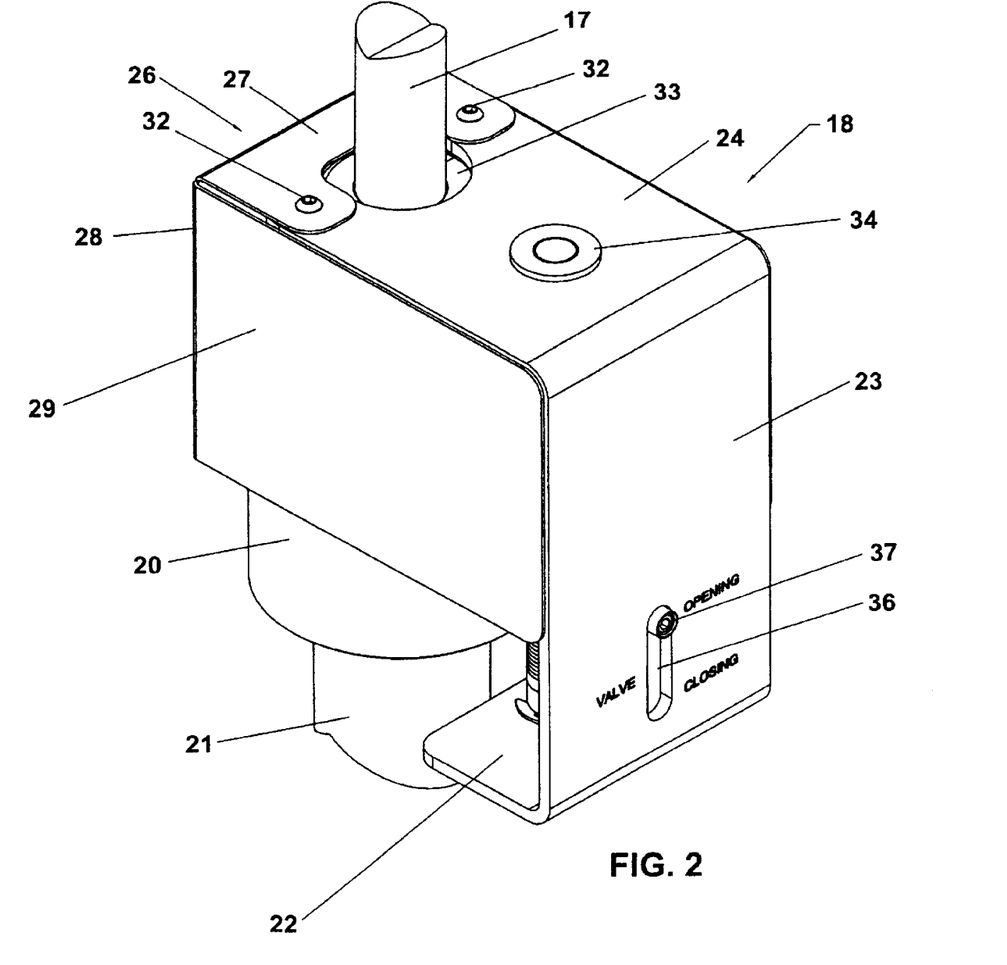
FIG. 2 is a much enlarged exterior perspective view of the valve indicator assembly itself.
Figure 3:
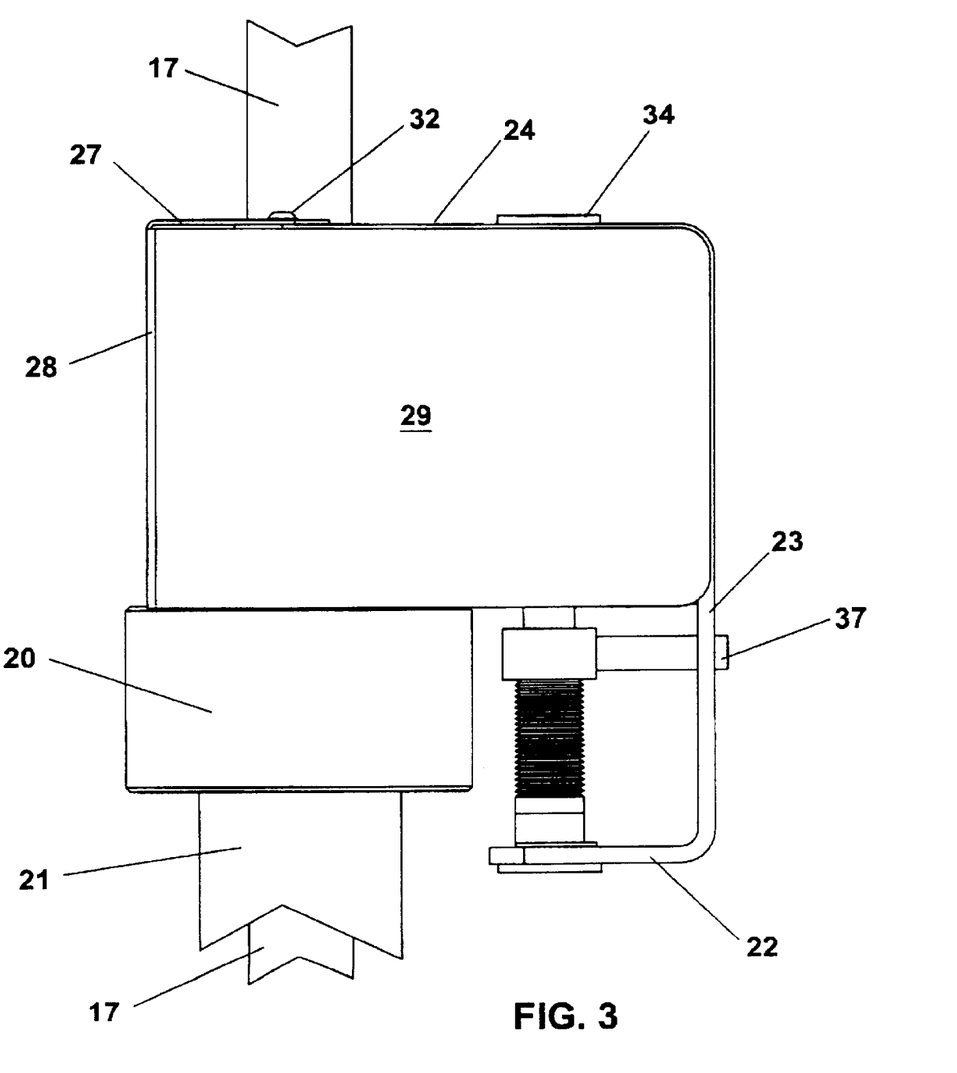
FIG. 3 is a side elevational view of the valve indicator assembly.
Figure 4:
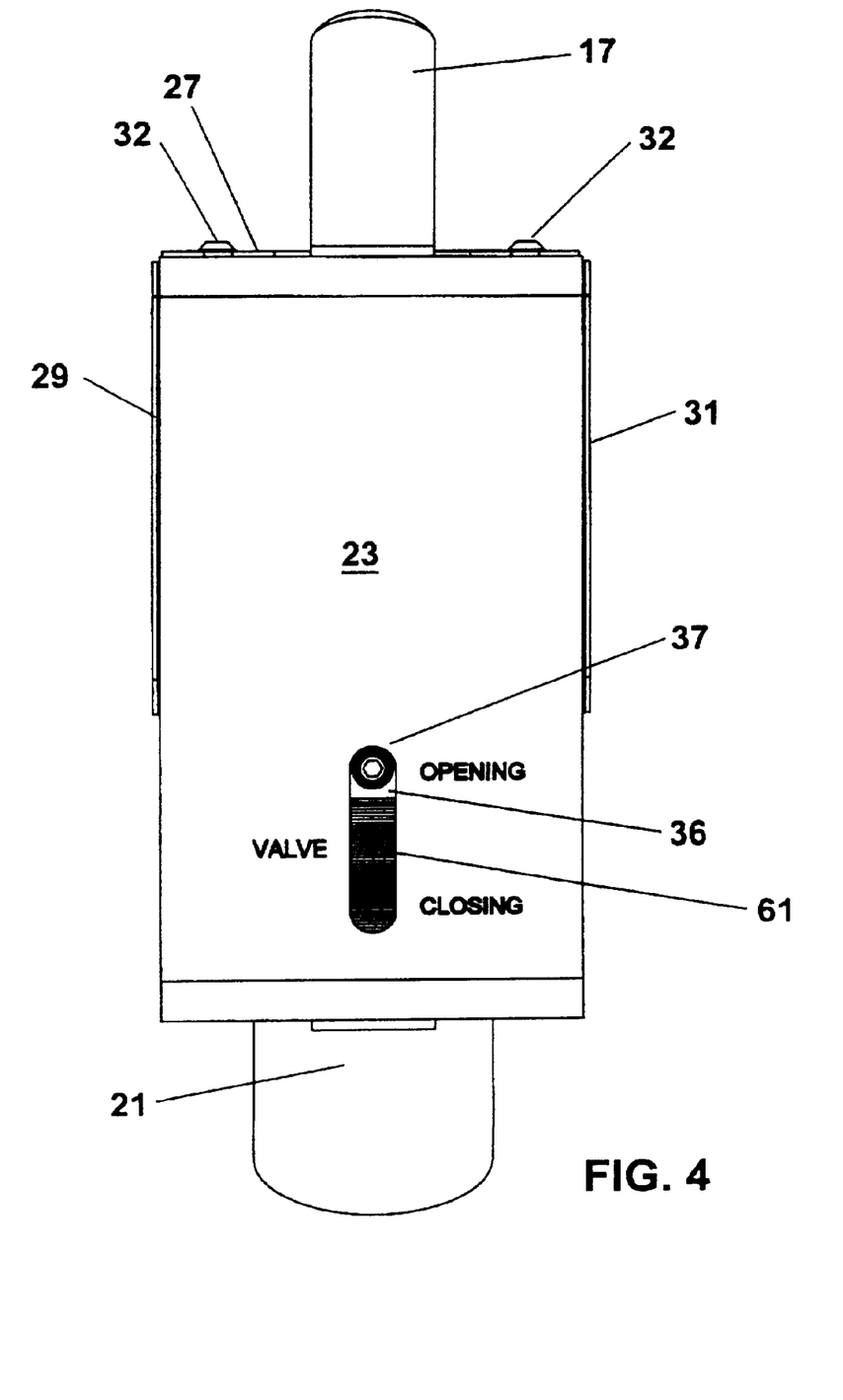
FIG. 4 is a front elevational view of the valve indicator assembly.
Figure 5:
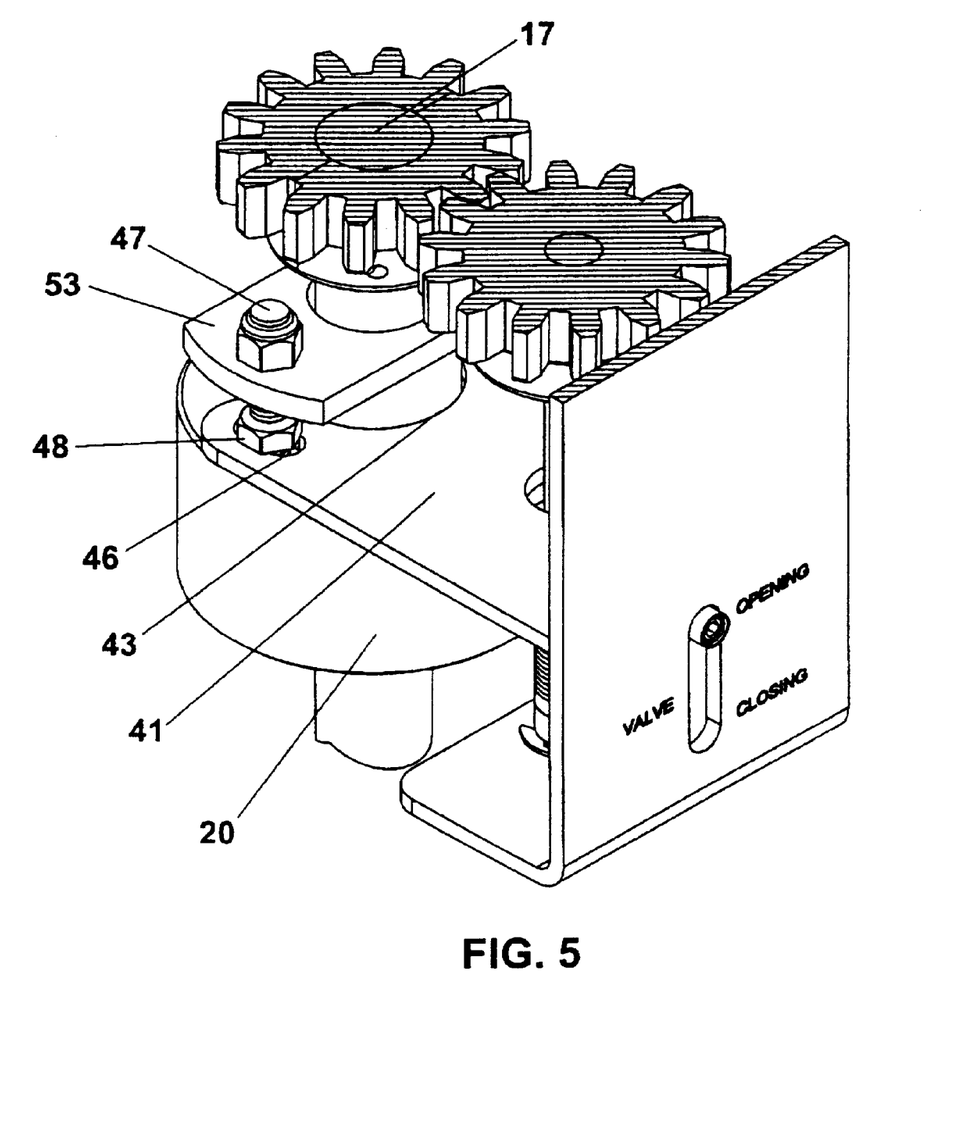
FIG. 5 is a perspective view similar to FIG. 2 but with the top and side closure omitted.
Figure 6:
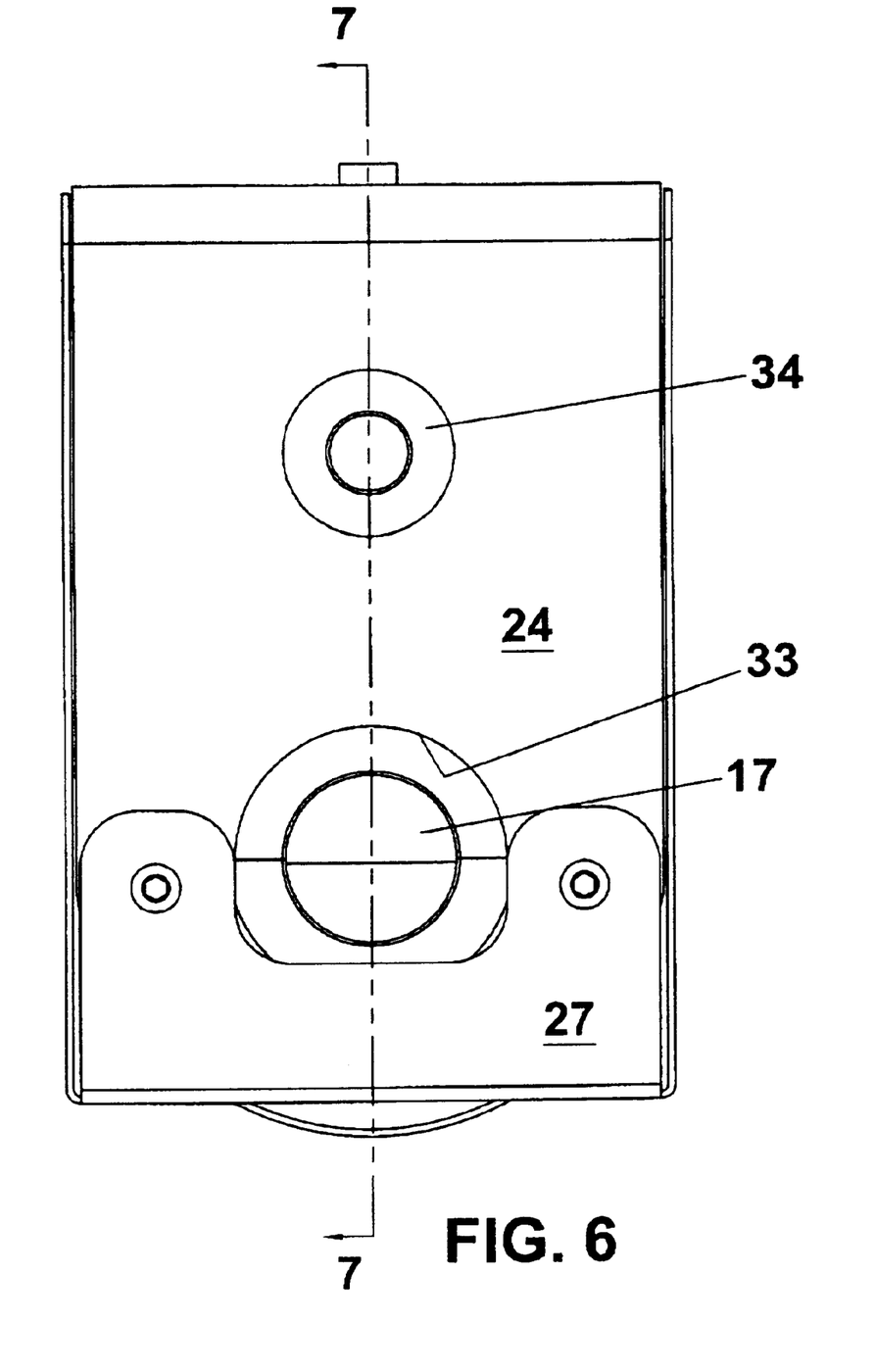
FIG. 6 is a top plan view.

Now, referring to other figures of the drawings, FIG. 2 shows the position indicator assembly 18 on an enlarged scale and mounted to the stand-off 21 with the valve operator shaft extending through it. It includes a generally C-shaped mounting bracket having a floor or bottom wall 22, front wall 23 and top 24, all of which can be formed from a single metal plate. This piece closes the front, part of the bottom and part of the top of the indicator assembly. A closure piece 26, which can also be formed from a single piece of sheet metal, for convenience, includes a top 27, rear 28, side 29, and an opposite side 31 parallel to side 29. This closure piece is fastened to the top 24 of the bracket by means of two screws 32 whose stems pass through apertures in the piece 26 and are screwed into the top 24 of the bracket. Notches in the tops 24 and 27 of the bracket and closure, respectively, provide a passageway 33 in the top through which the shaft 17 extends. A bushing with a radially extending flange 34 is mounted in an opening in the top 24. The front wall has a vertically extending slot 36 in it through which an indicator stem 37 or pointer extends to indicate the condition of the valve. As will be seen, this stem is movable from the top to the bottom of the opening as the valve is moved from opened to closed position. Accordingly, the legends "valve" and "opening" and "closing" appear in the appropriate locations on the front wall 23 of this bracket.

Referring now to FIGS. 5 through 9, the bracket has a mounting plate 41 which is welded at 42 (FIGS. 7 and 8) to the inside face of wall 23. It has a recess 43 accommodating the valve operating shaft 17. It also has two slots 46 on opposite sides of the recess and which receive through them, upstanding threaded studs 47 from the packing box 21 and which are anchored in the packing box. The bracket plate 41 is fastened to the packing box by nuts 48 threaded onto the stems of the two studs.

Figure 7:
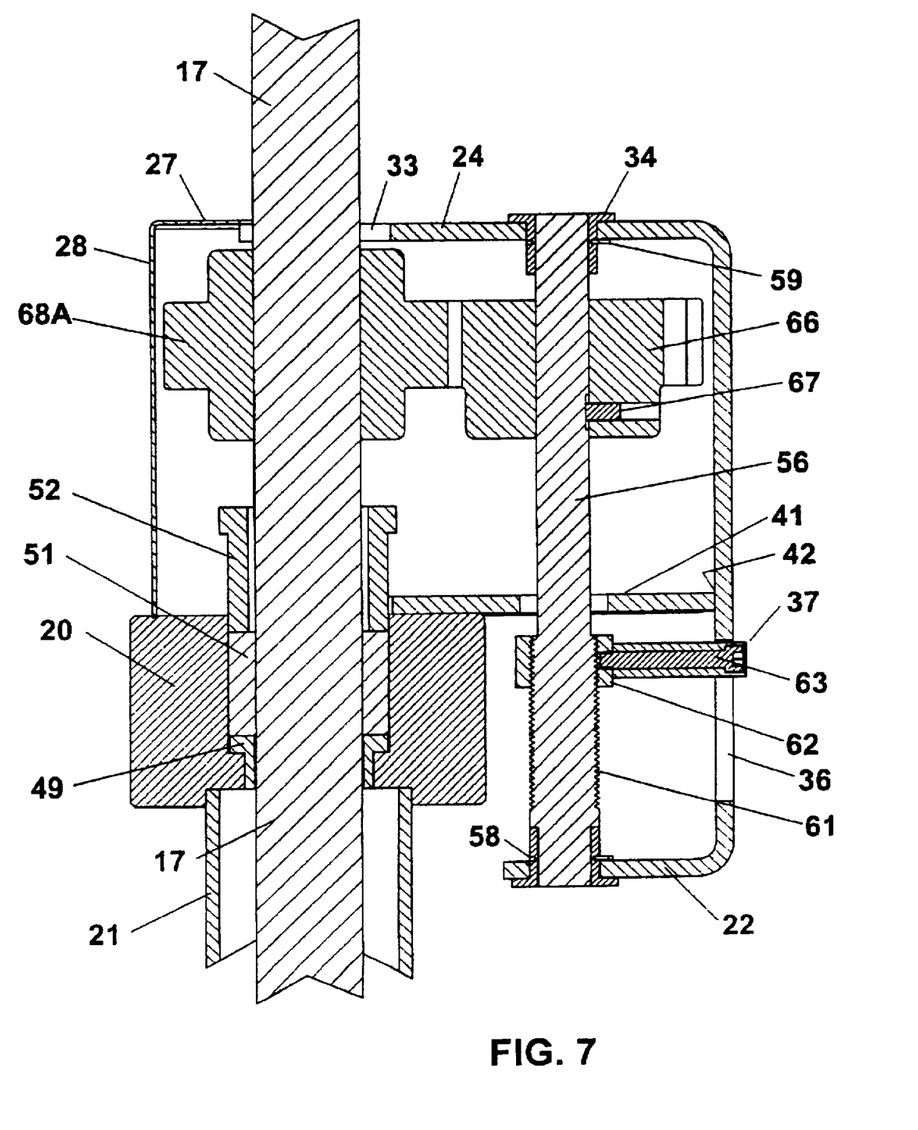
FIG. 7 is a section taken through the assembly at line 7—7 in FIG. 6 and viewed in the direction of the arrows.
Figure 8:
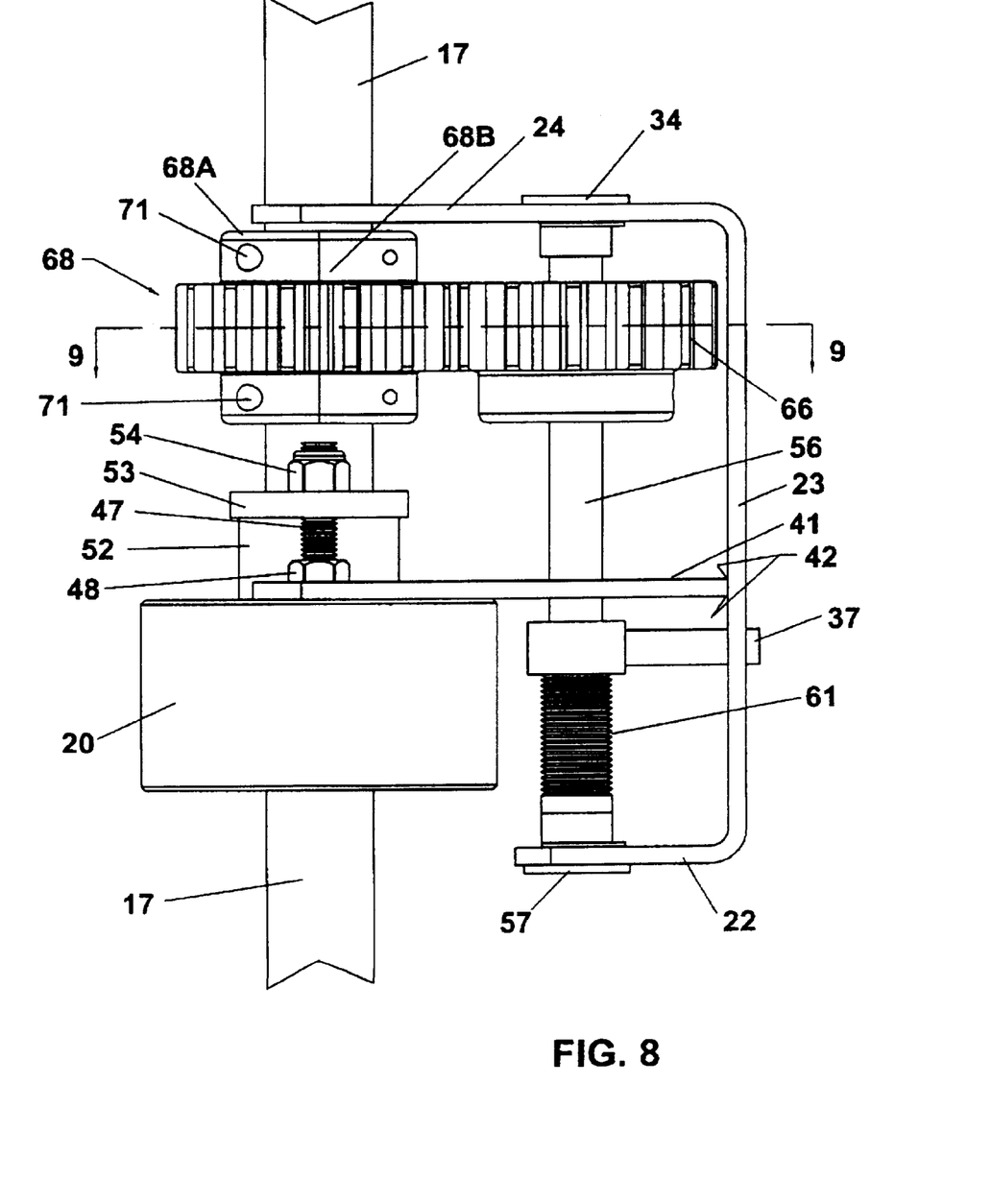
FIG. 8 is a side elevational view similar to FIG. 3 but with the side closure omitted.
Figure 9:
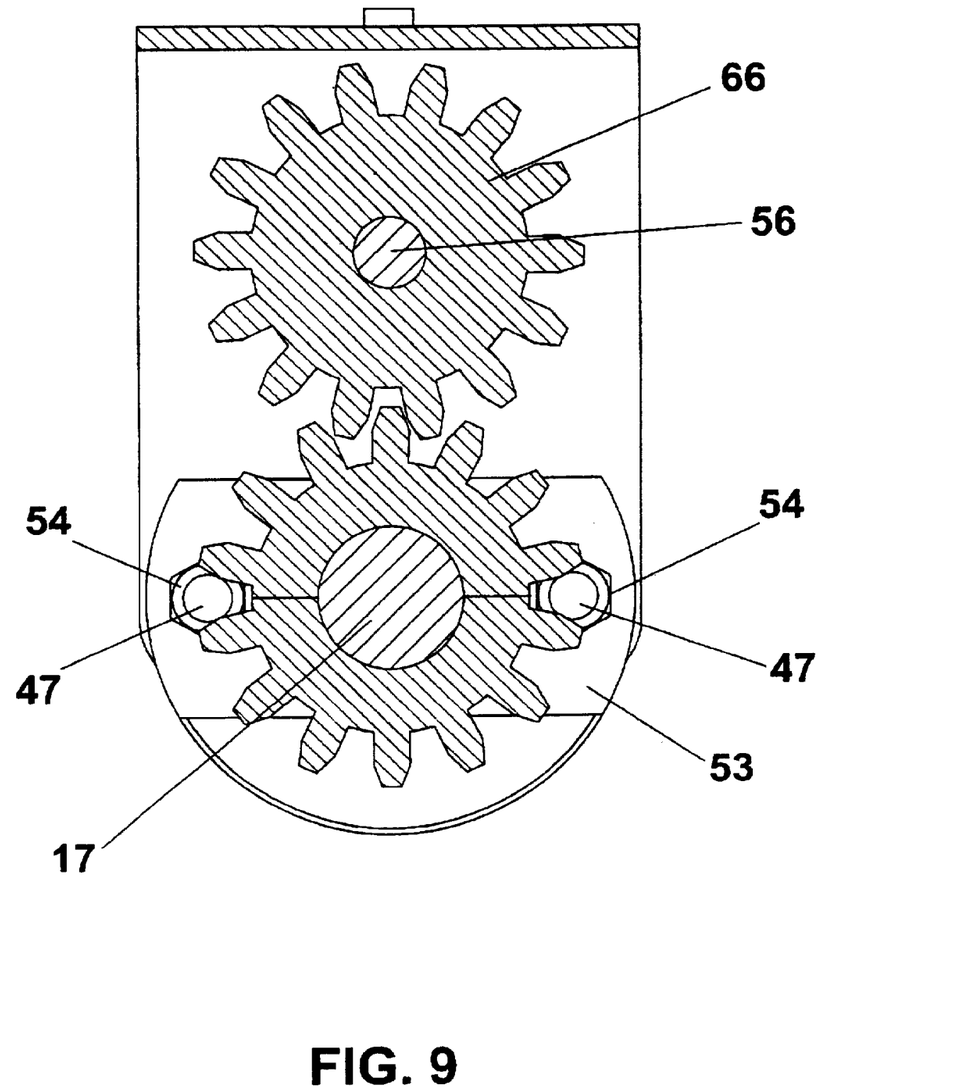
FIG. 9 is a section taken through the assembly of FIG. 8 at line 9—9 in FIG. 8 and viewed in the direction of the arrows.

As shown in FIG. 7, the packing box has a lower bushing 49 received in a vertically extending stepped bore in the box and which provides the lower support for packing 51. The upper packing gland 52 has a cylindrical portion received in that aperture and encircling the shaft 17, and a flange portion 53 having two apertures in it on opposite sides of the shaft 17 and through which the studs 47 are received. This packing gland is held down by two nuts 54 threaded onto the studs 47 on opposite sides of the shaft 17.

It was mentioned above that the mounting bracket includes an aperture in the top 24 through which a bushing extends, the upper flange of the bushing being shown at 34. This bushing mounts the upper end of an indicator drive screw 56. A bushing 57 is received in an aperture in the bottom wall of the bracket, with the flange of the lower bushing engaging the lower face of the bottom wall and a snap ring 58 in a groove in the bushing engaging the upper face of wall 22 and thus retaining the bushing in the wall. Thus, the shaft 56 is supported at the top and bottom in these bushings. Similarly, snap ring 59, received in a groove in the upper bushing, retains it in the top 24. The lower portion of screw 56 is externally threaded at 61 and receives a nut 62 thereon, to which the pointer stem 37 is fastened by a set screw 63 screwed into the nut 62. The pointer is shown at the uppermost limit of the travel in the slot 36 and will move downward as the shaft 56 is rotated in one rotational direction, and upward from any lower position when the shaft is operated in the opposite rotational direction.

A spur gear 66 is fastened near the upper end of the shaft 56 by a set screw 67. A spur gear 68 is clamped to shaft 17. This is a two-piece gear including one-half 68A and the other half 68B fastened together by screws in apertures 71 of which there may be four in each of the halves, with two apertures above the teeth and two below the teeth and threads in the opposite half. Because the bore of these two halves, when put together, is slightly smaller than the diameter of shaft 17, this gear can be clamped tightly onto the shaft 17 so that it neither rotates relative to the shaft nor is slidable up or down on shaft 17 after installation.

Gear 66 and gear 68 are placed into engagement so that when the shaft 17 is turned to open or close the valve, the shaft 56 will turn likewise, although in the opposite direction, and move the indicator pointer 37 down or up in the slot 36 as the valve gate is moved up to open it or down to close it. The amount of mesh can be adjusted by loosening the nuts 48 on the mounting plate portion 41 of the bracket and moving the bracket toward or away from shaft 17 and thereby moving the gears into tighter or looser engagement. Of course, the set screw 67 permits vertical alignment and adjustment of the gear 66 relative to gear 68. When the desired degree of engagement is achieved, the nuts 48 can again be screwed down onto the screws 47 to tighten the bracket plate 41 onto the top of the packing box 20, while the stud 47 remains fixed in the packing box. The slots in plate 41 permit the adjustment in and out when the nuts 48 are loosened, but without disturbing the nuts 54 retaining the packing gland 52 in place on the packing box.

Figure 10:
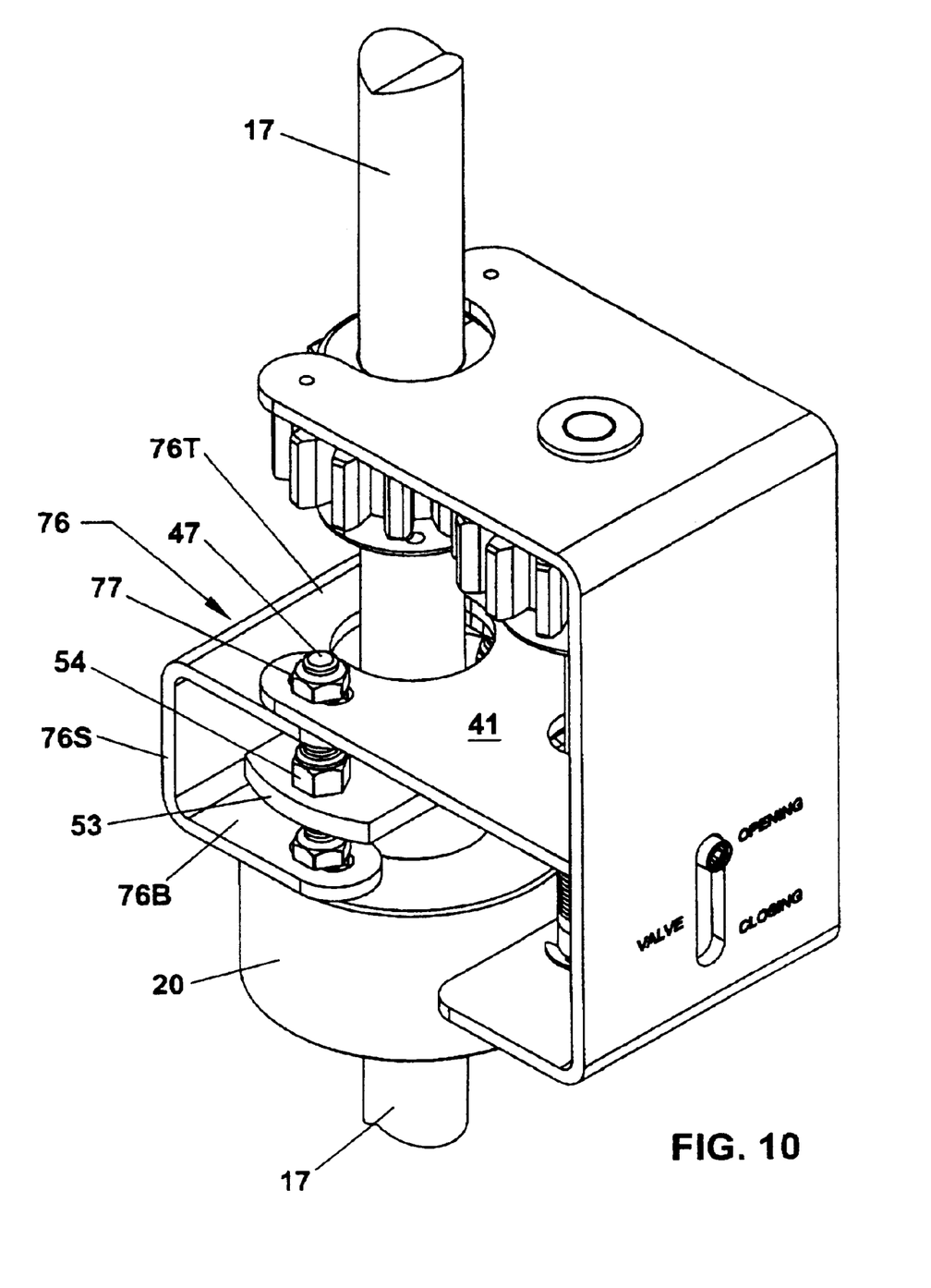
FIG. 10 is a view similar to FIG. 5 but showing an added spacer member to enable mounting to a packing box directly on top of the tank.
Figure 11:
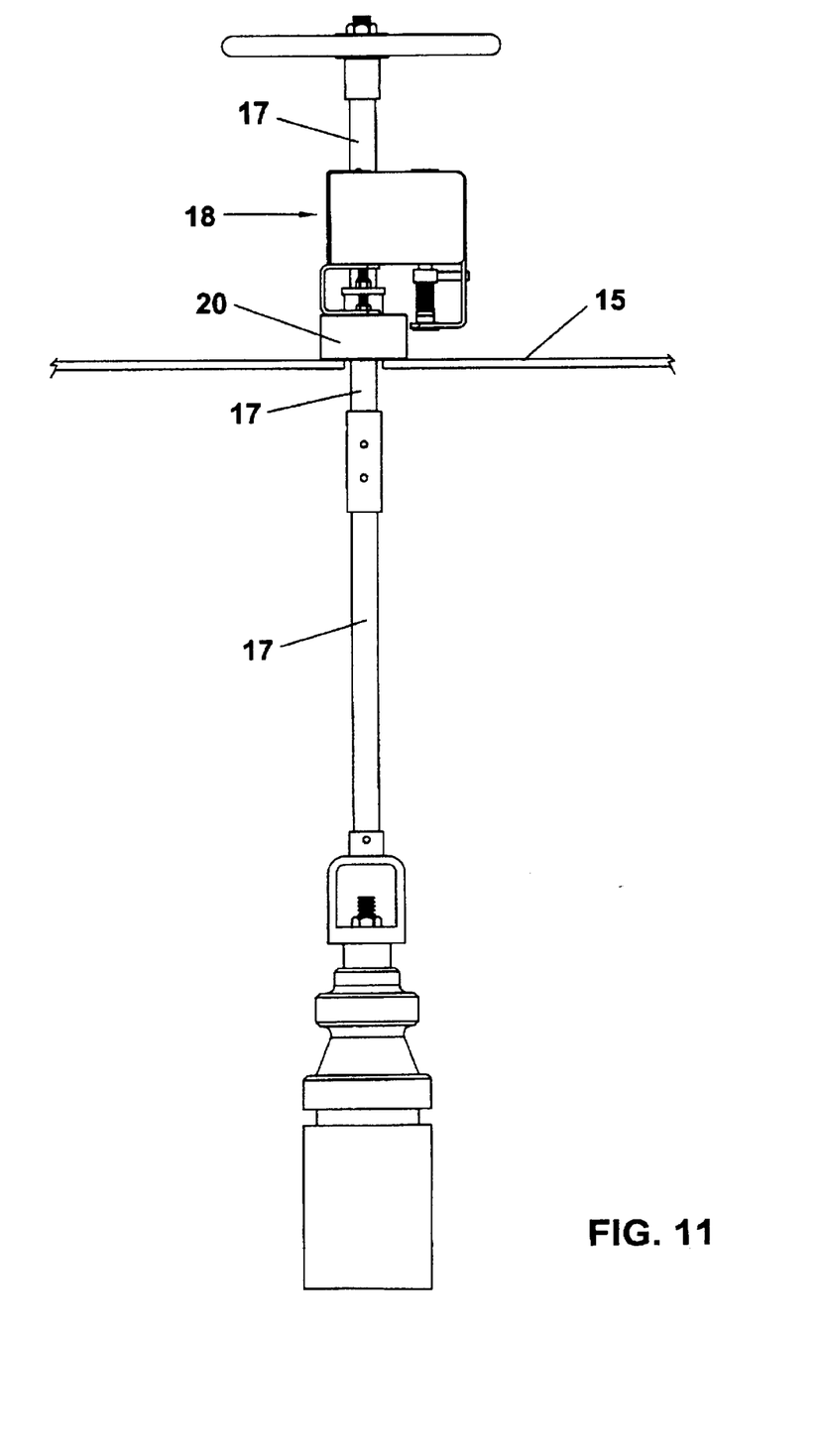
FIG. 11 is a view similar to FIG. 1A but showing the alternate embodiment of FIG. 10 mounted on the top of the tank.
Figure 12:
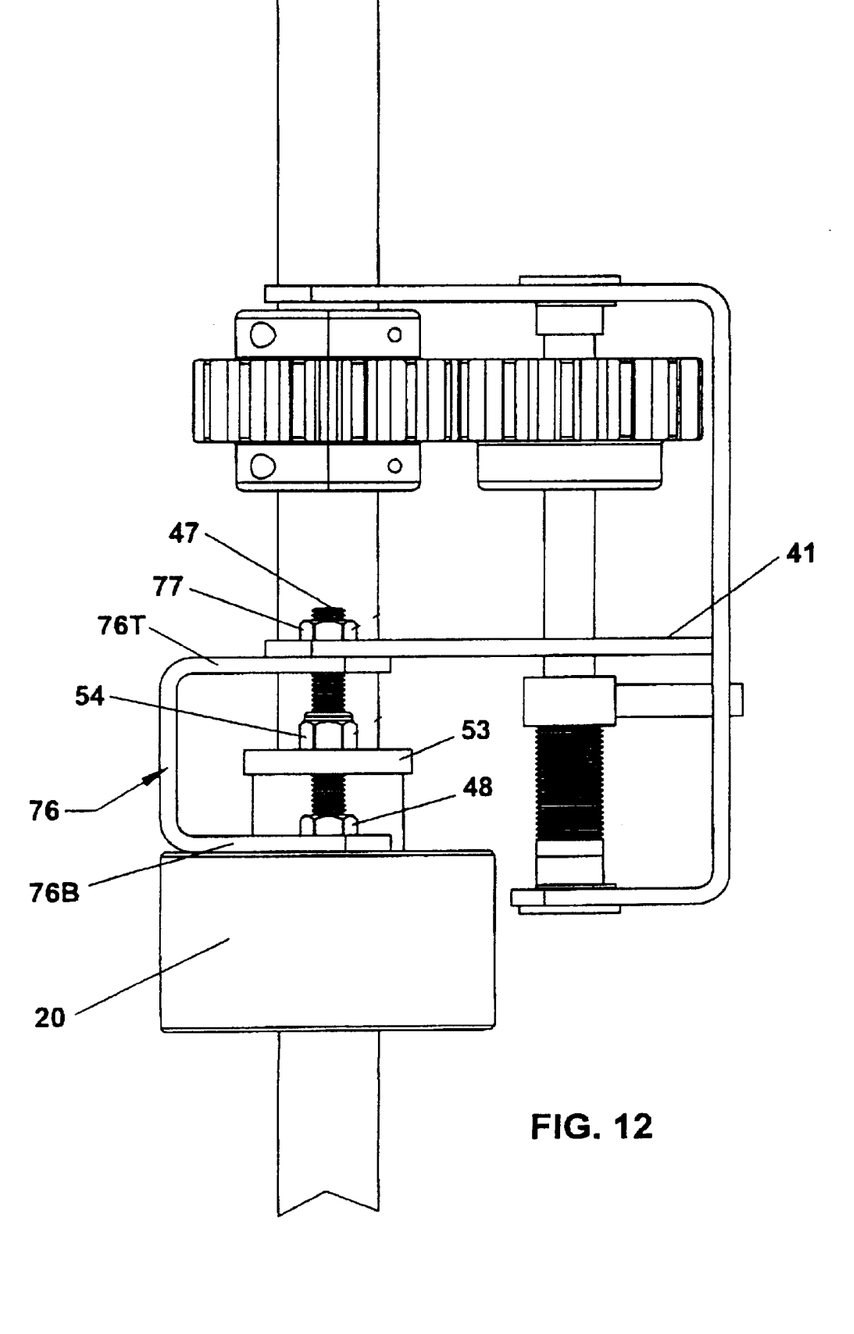
FIG. 12 is a view similar to FIG. 8 but showing the alternate embodiment of FIG. 10.

In the foregoing discussion, the valve position indicator assembly is mounted to an existing shaft packing box 20 which is mounted on a stand pipe 21 which communicates with the interior of the tank. Accordingly, the packing is provided in the box so the shaft is sealed and the contents of the tank cannot escape along the shaft to the surrounding atmosphere. The embodiment of FIGS. 10, 11 and 12 is the same in all respects except that it is adapted to mounting on a packing box which is secured directly to the top 15 of the tank. Therefore, with the packing box 20 fixed to and sealed to the top of the tank, a spacer bracket 76 is provided. It is generally C-shaped, with a top wall 76T, a side wall 76S, and a bottom wall 76B. The bottom wall is mounted directly to the top of the packing box using the two nuts 48 on the studs 47. Both the bottom wall 76B and top wall 76D have recesses in them essentially the same as recess 43 in mounting plate 41, to accommodate the shaft 17. The plate 41 is mounted to the bracket top 76T and secured in place by nuts 77, while the nuts 54 retain the packing gland by loading flange 53 as in the previously described embodiment. This arrangement provides clearance between the bottom wall 22 and the top 15 of the tank.

The present invention provides a simple way of providing valve condition indication for a valve assembly that is movable between closed and open condition without axial movement of the valve-operating shaft. In the present illustration, if the operating shaft is rotated clockwise when viewed from above to close the valve, the threads 61 on the indicator shaft 56 would be left-handed threads so that the indicator pointer 37 would move downward as the valve is closed, and upward as the valve is opened. The thread pitch can be established at any desired number consistent with the location and height of the slot 36 so that the movement of the pointer in the slot directly corresponds to the movement of the valve between the closed and open position, even if the pitch of the gate operating thread is different from that of thread 61.

The present invention provides a relatively simple and inexpensive way to provide a valve condition indicator at a location remote from the valve itself, and without the necessity of removing a valve operating handle which might be welded or corroded to the operating shaft. It can serve to save barge operators significant inconvenience and expense, while installing valve position indicators as required by law, by avoiding damage to the valve, and avoiding the cost of cleaning and gas freeing the barge tanks and avoiding loss of use of the barge in the process.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination comprising:
   a liquid cargo tank;
   a cargo valve inside the tank;
   valve operating means extending upward in the tank from the valve through the top of the tank and having a shaft portion projecting above the top of the tank and rotatable clockwise and counterclockwise on a first axis to close and open the valve;
   a mounting member for a valve condition indicator fixed relative to the tank;
   an indicator drive screw supported on said mounting member for rotation on a second axis parallel to the first axis;
   a pointer mounted on said drive screw and movable linearly on said drive screw as said screw is rotated;
   a scale on said mounting member and associated with said pointer for indicating valve condition;
   a first gear mounted on said shaft portion and comprising at least two pieces arranged for installation on said shaft portion by moving said pieces in opposite directions toward each other and transversely toward said axis; and
   a second gear mounted on said drive screw and engaged with said first gear and operable to drive said pointer as said shaft is rotated to change the condition of the valve.

2. The combination of claim 1 and wherein;
   said first gear has a rotational axis and is a two-piece gear cut in half in a plane containing said rotational axis.

3. The combination of claim 2 and wherein:
   the two halves of said first gear are clamped onto said shaft portion.

4. The combination of claim 1 and further comprising:
   a shaft seal housing supported on said tank;
   said mounting member being supported on said seal housing.

5. The combination of claim 4 and wherein:
   said seal housing is mounted on said tank top.

6. The combination of claim 4 and wherein:
   said seal housing is a packing box.

7. The combination of claim 4 and further comprising:
   a stand pipe mounted on the tank;
   the seal housing being mounted on the stand pipe at a location spaced above the tank top.

8. The combination of claim 4 and further comprising:
   an intermediate bracket mounted on the seal housing;
   the mounting member being mounted on the intermediate bracket.

9. The combination of claim 8 and wherein:
   the seal housing is a packing box, the combination further comprising:
   shaft sealing packing in the packing box;
   a packing gland bearing on the packing;
   fasteners connected to the packing box;
   first nuts on the fasteners and securing the intermediate bracket to the packing box;
   second nuts on the fasteners and loading the packing gland; and
   third nuts on the fasteners to fix the mounting member on the intermediate bracket.

10. The combination of claim 9 and wherein;
    the shaft portion extends through the sealing packing; and
    said first gear is mounted on the shaft portion above the sealing packing.

11. The combination of claim 10 and further comprising:
    a valve shaft operating handle mounted on the shaft portion above the first gear.

12. The combination of claim 11 and wherein:
    the handle is a hand-wheel.

13. A combination comprising:
    a liquid cargo tank;
    a cargo valve inside the tank;
    valve operating means extending upward in the tank from the valve through the top of the tank and having a shaft portion projecting above the top of the tank and rotatable clockwise and counterclockwise on a first axis to close and open the valve;
    a mounting member for a valve condition indicator fixed relative to the tank;
    an indicator drive screw supported on said mounting member for rotation on a second axis parallel to the first axis;
    a pointer mounted on said drive screw and movable linearly on said drive screw as said screw is rotated;
    a scale on said mounting member and associated with said pointer for indicating valve condition;
    a first gear mounted on said shaft portion and arranged for installation transversely on said shaft portion;
    a second gear mounted on said drive screw and engaged with said first gear and operable to drive said pointer as said shaft is rotated to change the condition of the valve; and
    a barge having a bottom and a top and having a plurality of liquid cargo holding tanks therein, the first-mentioned tank being one of said holding tanks, with the valve operating means including a handle above the top of the barge.

14. The combination of claim 13 and wherein:
    the valve operating means include an upper shaft portion above the top of the tank, with the valve operating handle at the top of the shaft portion; and
    the mounting member, drive screw, first gear, second gear, pointer, and scale are mountable to and removable from the valve operating means while the handle is fixed to the top of the shaft portion without removal of the handle.

15. The combination of claim 13 wherein:
    the cargo valve is a gate valve with a non-rising stem.

* * * * *